US011416862B2

(12) United States Patent
Moorthyrajan et al.

(10) Patent No.: US 11,416,862 B2
(45) Date of Patent: Aug. 16, 2022

(54) SYSTEMS AND METHODS FOR LOCATION-BASED MOBILE PAYMENTS

(71) Applicant: JPMORGAN CHASE BANK, N.A., New York, NY (US)

(72) Inventors: Saravanan Moorthyrajan, Bangalore (IN); Suman Devan, Bangalore (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 91 days.

(21) Appl. No.: 16/505,444

(22) Filed: Jul. 8, 2019

(65) Prior Publication Data

US 2021/0012342 A1 Jan. 14, 2021

(51) Int. Cl.
*G06Q 20/40* (2012.01)
*G06Q 20/32* (2012.01)
*G06Q 20/20* (2012.01)

(52) U.S. Cl.
CPC ......... *G06Q 20/4014* (2013.01); *G06Q 20/20* (2013.01); *G06Q 20/3224* (2013.01)

(58) Field of Classification Search
CPC .................. G06Q 20/326; G06Q 20/3224
See application file for complete search history.

(56) References Cited

U.S. PATENT DOCUMENTS

| | | | | |
|---|---|---|---|---|
| 2007/0136140 | A1* | 6/2007 | Smith | G06Q 30/0639 705/80 |
| 2010/0063889 | A1* | 3/2010 | Proctor, Jr | G06Q 30/0261 705/21 |
| 2012/0078764 | A1* | 3/2012 | Ross | G06Q 20/14 705/35 |
| 2013/0027227 | A1* | 1/2013 | Nordstrom | G01C 21/3438 340/990 |
| 2016/0078568 | A1* | 3/2016 | Trivedi | G06Q 40/02 705/33 |
| 2016/0275482 | A1* | 9/2016 | Zhou | G06Q 20/105 |

* cited by examiner

*Primary Examiner* — A. Hunter Wilder
(74) *Attorney, Agent, or Firm* — Greenberg Traurig LLP (57) ABSTRACT

Systems and methods for in location-based mobile payments are disclosed. According to one embodiment, in an information processing apparatus comprising at least one computer processor, a method for location-based mobile payments may include: (1) receiving, from a first computer program executed by a first electronic device for a first party, a request to conduct a location-based transaction; (2) receiving, from the first computer program, a location of the first electronic device; (3) identifying a potential counterparty based on a location of a second electronic device associated with the potential counterparty; (4) communicating an image of the potential counterparty to the first computer program; (5) receiving a selection of the potential counterparty from the first computer program; and (6) conducting the location-based transaction between the party and the potential counterparty.

12 Claims, 4 Drawing Sheets

SYSTEMS AND METHODS FOR LOCATION-BASED MOBILE PAYMENTS

BACKGROUND OF THE INVENTION

1. Field of the Invention

The present disclosure generally relates to systems and methods for location-based mobile payments.

2. Description of the Related Art

Despite the popularity of person-to-person payments made using mobile devices, there still exists some amount of friction and trust deficit. For example, some mobile payment applications require that the payee details be known to the payer upfront and involves a registration process. Some solutions, such as QR code scanning, involve additional step to capture payee information. Solutions that involve near-field communication require special hardware at the merchant end. And, there exists some amount of trust deficit as there is no visual confirmation of the purported payee during the payments process.

SUMMARY OF THE INVENTION

Systems and methods for in location-based mobile payments are disclosed. In one embodiment, in an information processing apparatus comprising at least one computer processor, a method for location-based mobile payments may include: (1) receiving, from a computer program executed by an electronic device, a registration request to register an individual or a merchant for location-based mobile payments; (2) receiving, from the computer program, an image of the individual or a logo for the merchant; (3) capturing identifying information for the electronic device; (4) receiving, from the computer program, an identification of an account associated with the individual or merchant for sending or receiving money; and (5) storing an association of the image or logo, the identifying information for the electronic device, and the identification of the account.

In one embodiment, wherein the electronic device may include a mobile electronic device.

In one embodiment, the method may further include receiving location information for the merchant; and associating the location information with the image or logo, the identifying information for the electronic device, and the identification of the account In one embodiment, the electronic device may include a point of sale device.

In one embodiment, a first account may be identified for sending money, and a second account is identified for receiving money.

In one embodiment, the identification information may include a MAC address, a serial number, an International Mobile Subscriber Identity (IMSI), an Extended Unique Identifier (EUI), an Organizationally Unique Identifier (OUI), an International Mobile Station Equipment Identity (IMEI), a Mobile Station ISDN (MSISDN), etc.

In one embodiment, the method may further include receiving, from the individual or the merchant, an identification of at least one condition under which additional authentication is required.

According to another embodiment, in an information processing apparatus comprising at least one computer processor, a method for location-based mobile payments may include: (1) receiving, from a first computer program executed by a first electronic device for a first party, a request to conduct a location-based transaction; (2) receiving, from the first computer program, a location of the first electronic device; (3) identifying a potential counterparty based on a location of a second electronic device associated with the potential counterparty; (4) communicating an image of the potential counterparty to the first computer program; (5) receiving a selection of the potential counterparty from the first computer program; and (6) conducting the location-based transaction between the party and the potential counterparty.

In one embodiment, the first electronic device may include a mobile electronic device.

In one embodiment, the second electronic device may include a point of sale device.

In one embodiment, the potential counterparty may be a merchant, and the image may include a logo associated with the merchant.

In one embodiment, the party may be a merchant, and the counterparty may be a customer.

In one embodiment, the location of the second electronic device may be within a predetermined distance of the first electronic device.

In one embodiment, conducting the location-based transaction between the party and the potential counterparty may include retrieving identified accounts for the transaction for the party and the potential counterparty from a database.

In one embodiment, the method may further include receiving an identification of accounts for the transaction from at least one of the party and the potential counterparty.

In one embodiment, the method may further include communicating an image of the party to a second computer program executed by the second electronic device; and receiving a confirmation for the transaction from the second computer program.

In one embodiment, a plurality of potential counterparties may be identified.

In one embodiment, the method may further include ranking the plurality of potential counterparties; and communicating the ranking of the potential counterparties to the first computer program.

In one embodiment, the plurality of potential counterparties may be ranked based a proximity to the first electronic device.

In one embodiment, the plurality of potential counterparties may be ranked based on at least one prior transaction conducted by at least one of the potential counterparties.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments are directed to systems and methods for location-based mobile payments.

Embodiments are generally directed to a location-based payment network that connects payers with payees within, for example, a configured radius of the GPS location for casual payments. Embodiments may provide a trusted means of making casual mobile payments to individuals or merchants without the need for payee registration or any special hardware.

In one embodiment, the payment network may include individuals and merchants that register with the payment network. For individuals, payment features (e.g., send or request payment) may be available through the individual's mobile devices, such as smartphones, smart watches, etc. For merchants, no special hardware may be required to support payments over the payment network.

In embodiments, individuals may have the ability to turn their visibility to others in the payment network on or off.

In embodiments, merchants may integrate the payment network functionality into their billing software, or the payment network may be a stand-alone payment system.

In one embodiment, during registration, network participants may provide the details of accounts from which money can be debited and credited, such as deposit accounts, lines of credit, credit card accounts, etc.

In one embodiment, the movement of funds may be processed by backend services within and that subscribe to the payment network.

In one embodiment, individuals may register with the payment network using, for example, their picture. Merchants may register with their business logo or some other identifier that may be presented on the point of sale device. The pictures and logos may be used to confirm the identity of the parties to the payment transaction to each other.

Embodiments may provide individuals with the ability to make casual payments (e.g., peer to peer payments) to payees in their vicinity; may provide trust for the transaction as the list of payment network participants is controlled by the network for a given GPS location; and may provide assurances that the transaction is being conducted with the correct party based on the participants' photos and/or logos. For merchants, embodiments may not require the use of special hardware.

Figure 1:
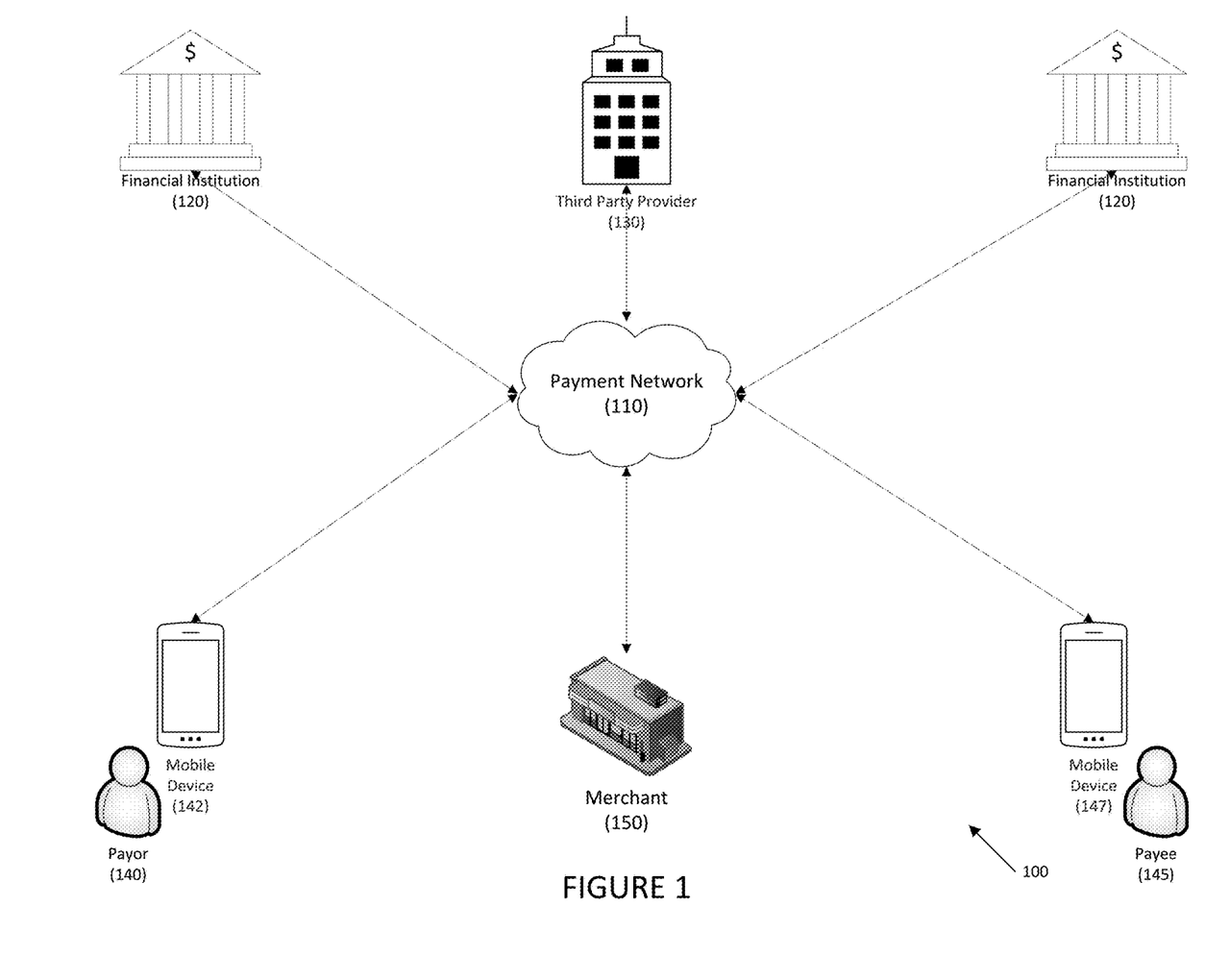
FIG. 1 depicts a system for location-based mobile payments according to one embodiment.

Referring to FIG. 1, a system for location-based mobile payments is provided according to one embodiment. System 100 may include payment network 110, one or more financial institution 120, third part provider 130, payor and mobile device 142, payee 145 and mobile device 147, and one or more merchant 150.

Financial institutions 120 may be any suitable financial institutions, such as banks, fintech providers, etc. In one embodiment, financial institutions 120 may maintain accounts (e.g., deposit, line of credit, credit card, etc.) of payor 140, payee 145, and/or merchant(s) 150. In another embodiment, financial institutions 120 may maintain accounts for alternative currencies (e.g., reward or loyalty points, etc.).

In one embodiment, payor 140 may transfer funds (e.g., money, alternative currencies, etc.) to merchant 150 or payee 145. In one embodiment, the transfer may be in exchange for a good or service, or it may be a payment that is not related to the receipt of a good or service.

Payor 140 and payee 145 may access payment network 110 using, for example, mobile devices 142 and 147, respectively. Mobile devices 142 and 147 may be any suitable electronic device that may provide location-sensing technology (e.g., GPS), including smart phones, smart watches, smart rings, tablet computers, notebook computers, portable Internet of Things (IoT) appliances, embedded devices (e.g., embedded in a vehicle, etc.).

In one embodiment, mobile devices 142 and 147 may execute applications (e.g., mobile computer applications, computer programs, etc.) to facilitate interaction with payment network 110.

Merchant 150 may be any suitable provider of a good or service. For example, merchant 150 may include stores, individuals, vending machines, kiosks, ATMs, taxis, self-driving vehicles, parking meters, tolls, garages, etc.

Merchant 150 may access payment network using a merchant device (not shown), such as a point of sale device, a computer system (e.g., terminals, kiosks, tablet computers, etc.), etc. In one embodiment, any of these devices may use application programmable interfaces (APIs) to interface with payment network 110.

In one embodiment, merchant 150 may use payment network 110 in addition to its other traditional payment networks (e.g., Visa). In another embodiment, merchant 150 may use payment network instead of using its traditional payment networks.

Payment network 110 may connect financial institution(s) 120, third party provider 130, payor 140, payee 145, and merchant 150. In one embodiment, payment network 110 may be hosted or provided by one or more financial institution 120, by third party provider 130, etc.

Payment network 110 may include one or more computer processors (e.g., servers), cloud processing, etc. Payment network 110 may interface with applications executed by mobile devices 142 and/or 147, merchant devices (not shown), and back-end systems (not shown) for financial institution(s) 120 and/or third-party provider 130.

Figure 2:
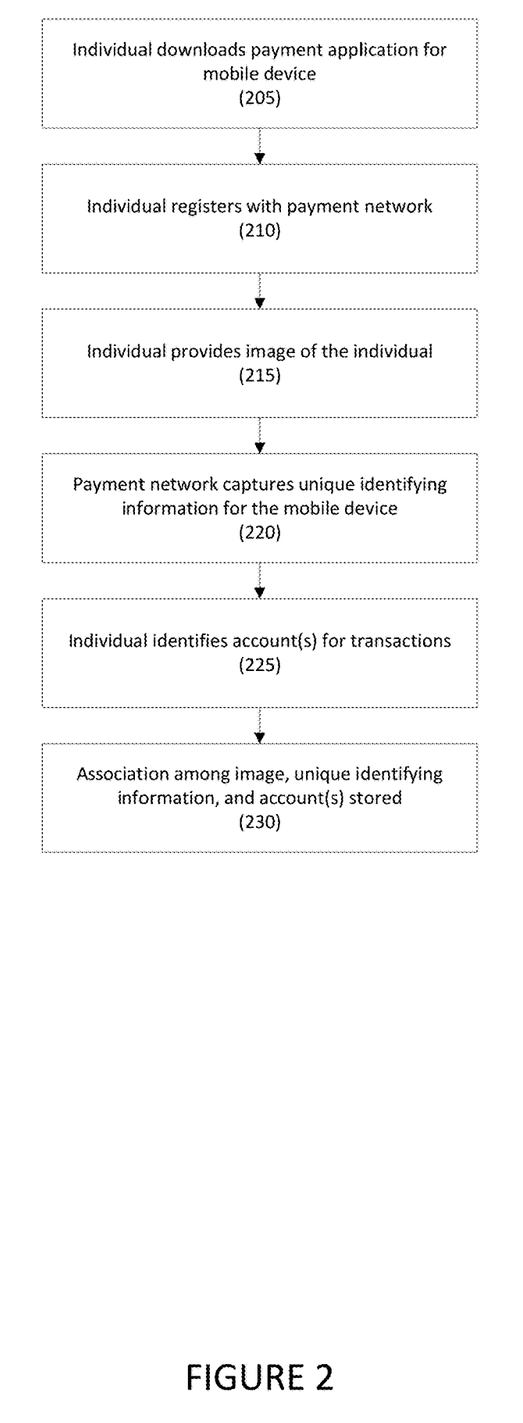
FIG. 2 depicts a method for individual registration for location-based mobile payments according to one embodiment.

Referring to FIG. 2, a method for individual registration for location-based mobile payments is provided according to one embodiment.

In step 205, an individual may download a computer program or application for interacting with the location-based payment network. In one embodiment, the computer program may be a mobile application, or "app" that may be installed and executed by the individual's mobile electronic device (e.g., smartphone, smart watch, tablet computer, etc.).

In step 210, the individual may register with the payment network. In one embodiment, this may include providing a name, email address, phone number, and account information.

In one embodiment, the individual may be authenticated using biometric authentication, out-of-band authentication, etc.

In step 215, the individual may register an image or photograph of the individual with the payment network.

In step 220, the payment network may capture unique identifying information for the mobile device, such as the device's MAC address, the device's serial number, the device's International Mobile Subscriber Identity (IMSI), the device's Extended Unique Identifier (EUI), the device's Organizationally Unique Identifier (OUI), the device's International Mobile Station Equipment Identity (IMEI), the device's Mobile Station ISDN (MSISDN), the device's Android ID, etc. Any other information suitable for identification may be captured as is necessary and/or desired.

In step 225, the individual may identify one or more financial accounts for making and/or receiving payments, such as deposit accounts, credit accounts, non-monetary accounts, etc. In one embodiment, the user may identify a default account for a given condition (e.g., a checking account for receiving money, a credit card account for making payments with merchants, a savings account for sending money to individuals, etc.). Any suitable condition (e.g., type of transaction, transaction amount, etc.) may be used as is necessary and/or desired.

In one embodiment, the individual may specify one or more conditions under which additional authentication may be required, and the type of additional authentication that may be required. For example, the individual may not require additional authentication for transactions under $100, but may require additional authentication for transactions over $100. The individual may specify other conditions, such as geographical conditions, time conditions, merchant conditions, good or services conditions, etc. In addition, conditions may be combined (e.g., over $100 and at night). The number and types of conditions may vary as is necessary and/or desired.

The individual may also specify the type of additional authentication, such as the entry of a PIN, a one-time passcode, entry of a biometric (e.g., fingerprint, facial, voice, etc.). The types of additional authentication may vary as is necessary and/or desired.

In step 230, the payment network may store an association of the image, the unique identifying information for the mobile device, and the account(s). The association may be stored, for example, in a database.

Figure 3:
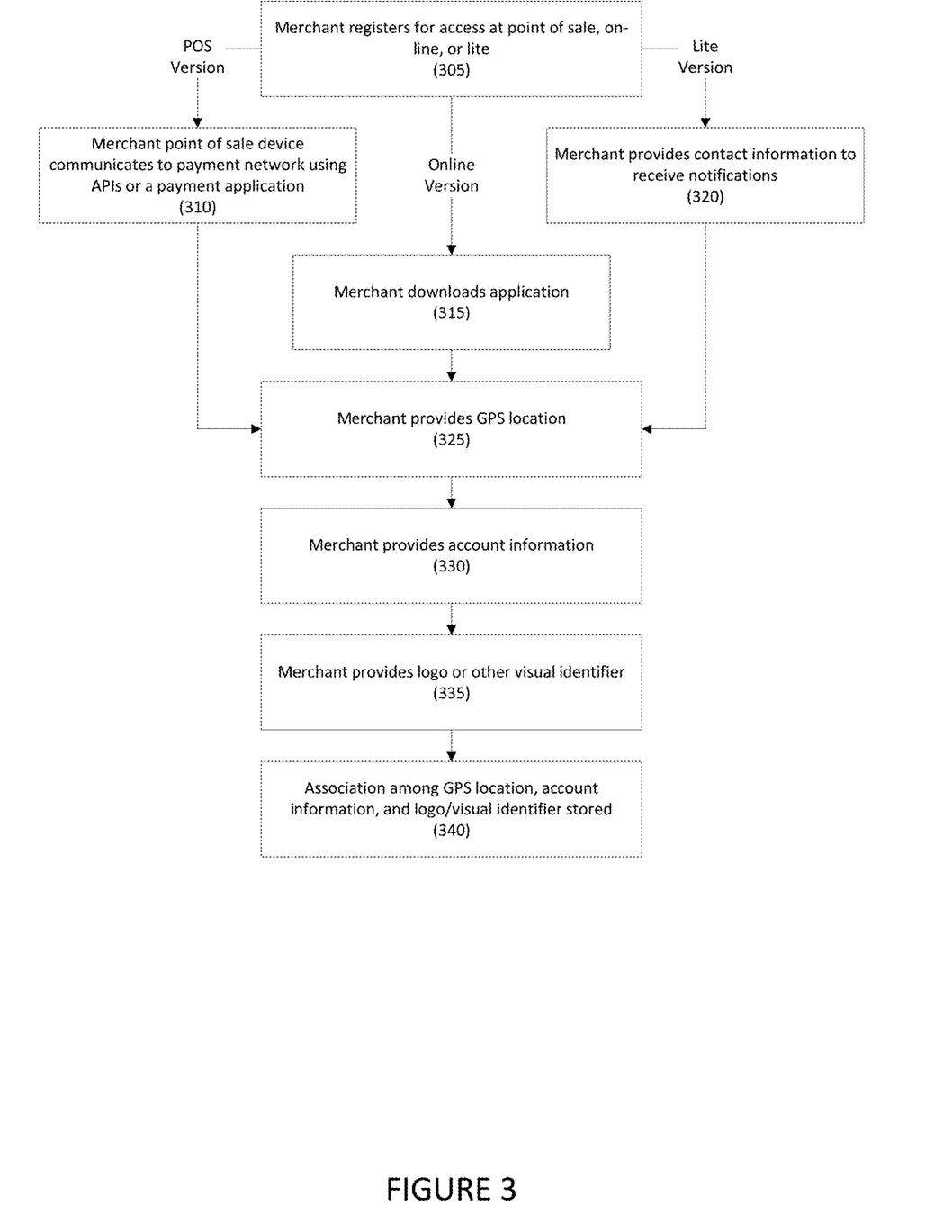
FIG. 3 depicts a method for merchant registration for location-based mobile payments according to one embodiment.

Referring to FIG. 3, a method for merchant registration for location-based mobile payments is provided according to one embodiment.

In step 305, a merchant may register for payment network access at one or more of a point of sale (POS) device, online, or for notification only (i.e., the "lite" version).

If the merchant is registering for POS access, in step 310, the merchant POS device may communicate with the payment network using APIs. In one embodiment, the merchant may integrate a software development kit (SDK) that provided by the payment network in order communicate with the network APIs.

If the merchant is registering for online access, in step 315, the merchant may download a computer program or application on the merchant's payment system.

If the merchant is registering for lite access, in step 320, the merchant may provide contact information to be notified when a payment is received.

In step 325, the merchant may provide location information, such as a GPS location for merchant physical site.

In step 330, the merchant may identify one or more financial accounts for making and/or receiving payments, such as deposit accounts, credit accounts, non-monetary accounts, etc.

In step 335, the merchant may register a logo or other identifier for the merchant with the payment network. In one embodiment, if the merchant does not have a logo, the payment network may assign a logo or graphic to the merchant, and the merchant will display this logo or graphic at its POS device location(s).

In step 340, the payment network may store an association among the merchant's GPS location, the account information, and the logo/visual identifier. The association may be stored, for example, in a database.

Figure 4:
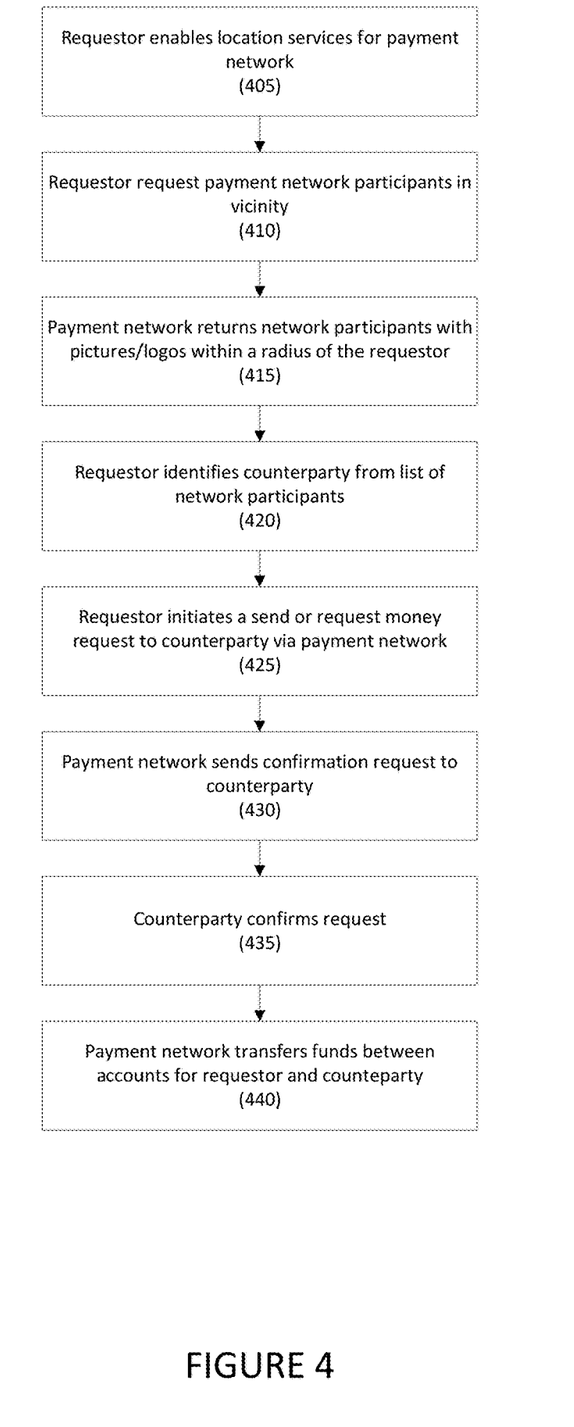
FIG. 4 depicts a method for using a location-based payment network to conduct a location-based transaction according to one embodiment.

Referring to FIG. 4, a method for using a location-based payment network to conduct a location-based transaction is provided according to one embodiment.

In step 405, the requestor, who may be requesting to send money or to receive money from a payment network participant, may enable location services for the requestor's mobile electronic device. In one embodiment, this may allow the mobile electronic device to share its location (e.g., GPS location) with the payment network.

If the requestor is a merchant, the requestor's location information may already be known to the payment network from the registration process.

In step 410, the requestor may request that the payment network identify payment network participants (e.g., individuals, merchants, vending machines, etc.) in the requestor's vicinity. In one embodiment, the requestor may specify a radius for the vicinity; in another embodiment, the radius may be adjusted automatically based, for example, on the accuracy of the GPS data or location services data, the number of network participants in the vicinity, etc.

In one embodiment, vending machines, kiosks, self-driving vehicles, and similar devices that participate in the payment network may be identified as is necessary and/or desired.

In one embodiment, the requestor may specify whether the network participants are merchants or individuals.

In step 415, the payment network may identify network participants within the radius and may return the network participants with their photos for individuals, or logos or other identifiers for merchants.

In one embodiment, the network participants' names, business names, etc. may be provided as is necessary and/or desired.

In one embodiment, the network participants may be presented based on their proximity to the requestor (e.g., closest network participants are listed first), based on past transactions, etc.

In one embodiment, machine learning may be used to rank the network participants based, for example, on past usage patterns.

In step 420, the requestor may identify the counterparty from the list of network participants. In one embodiment, the requestor may use the picture, logo, or other identifier to confirm the identity of the counterparty.

In step 425, the requestor may initiate a send or receive request to the counterparty via the payment network. In one embodiment, the requestor may provide an amount, a description of the reason for the request, etc.

In step 430, the payment network may send the request with a confirmation request to the counterparty. In one embodiment, the payment network may send the requestor's photo (if an individual) or logo or other identifier (if a merchant) to the counterparty. The payment network may further provide a description of the reason for the request.

In step 435, the counterparty may receive and confirm the send or receive money request.

In one embodiment, if the counterparty is a merchant, the merchant may confirm the transaction using the merchant application or using the POS.

In step 440, after receiving confirmation, the payment network may transfer funds between the requestor and the counterparty in accordance with the request. In one embodiment, the payment network may use the accounts and/or account preferences specified by the requestor and the counterparty to transfer funds.

In one embodiment, if the transaction meets one or more conditions specified by either party, the payment network may require additional authentication as may be specified by the party during the registration process.

In one embodiment, transactions between different financial institutions may be processed using existing money movement infrastructure.

It should be recognized that the embodiments disclosed herein are not exclusive to each other; features and elements from one embodiment may be used with others as is necessary and/or desired.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for location-based mobile payments, comprising:

receiving, at a payment network computer program executed by a computer processor for a payment network and from a first computer program executed by a first mobile electronic device for a first party, a request to conduct a location-based mobile electronic device to mobile electronic device transaction;

receiving, by the payment network computer program, a current Global Positioning System (GPS) location of the first mobile electronic device from a GPS module on the first mobile electronic device;

receiving, by the payment network computer program, current GPS locations for a plurality of second mobile electronic devices within a predetermined distance of the current GPS location of the first mobile electronic device;

identifying, by the payment network computer program, potential counterparties to the mobile electronic device to mobile electronic device transaction that are associated with the second mobile electronic devices based on the current GPS location of the first mobile electronic device and the current GPS locations of the plurality of second mobile electronic devices, wherein the current GPS locations of the second mobile electronic devices are received from GPS modules in the second mobile electronic devices;

in response to the identification, retrieving, by the payment network computer program, images of the potential counterparties;

ranking, by the payment network computer program, the potential counterparties based on past payment transaction patterns for each potential counterparty;

communicating, by the payment network computer program, the images of the potential counterparties to the first computer program;

receiving, by the payment network computer program, a selection of one of the potential counterparties from the first computer program; and conducting, by the payment network computer program, the location-based mobile electronic device to mobile electronic device transaction between the first party and the selected potential counterparty.

2. The method of claim 1, wherein the potential counterparty is a merchant, and the image comprises a logo associated with the merchant.

3. The method of claim 1, wherein the first party is a merchant, and the potential counterparty is a customer.

4. The method of claim 1, wherein the current GPS location of the second mobile electronic device is within a predetermined distance of the current GPS location of the first mobile electronic device.

5. The method of claim 1, wherein conducting the location-based mobile electronic device to mobile electronic device transaction between the first party and the potential counterparty comprises:

retrieving, by the payment network computer program, identified accounts for the location-based mobile electronic device to mobile electronic device transaction for the first party and the potential counterparty from a database.

6. The method of claim 1, further comprising:

receiving, by the payment network computer program, an identification of accounts for the location-based mobile electronic device to mobile electronic device transaction from at least one of the first party and the potential counterparty.

7. The method of claim 1, further comprising:

communicating, by the payment network computer program, an image of the first party to a second computer program executed by the second mobile electronic device; and receiving, by the payment network computer program, a confirmation for the location-based mobile electronic device to mobile electronic device transaction from the second computer program.

8. The method of claim 1, wherein a plurality of potential counterparties are identified.

9. The method of claim 8, further comprising:

ranking, by the payment network computer program, the plurality of potential counterparties; and communicating, by the payment network computer program, the ranking of the potential counterparties to the first computer program.

10. The method of claim 8, wherein the plurality of potential counterparties are ranked based on a proximity of the current GPS locations for the second mobile electronic devices associated with each of the plurality of potential counterparties to the current GPS location of the first mobile electronic device.

11. The method of claim 8, wherein the plurality of potential counterparties are ranked based on at least one prior transaction conducted by at least one of the potential counterparties.

12. The method of claim 1, wherein the first party and the counterparty are participants in the payment network.

* * * * *